Sept. 25, 1962     J. D. CHRISTIAN     3,056,054
PULLEYS AND LIKE POWER DRIVE DEVICES
Filed June 1, 1960
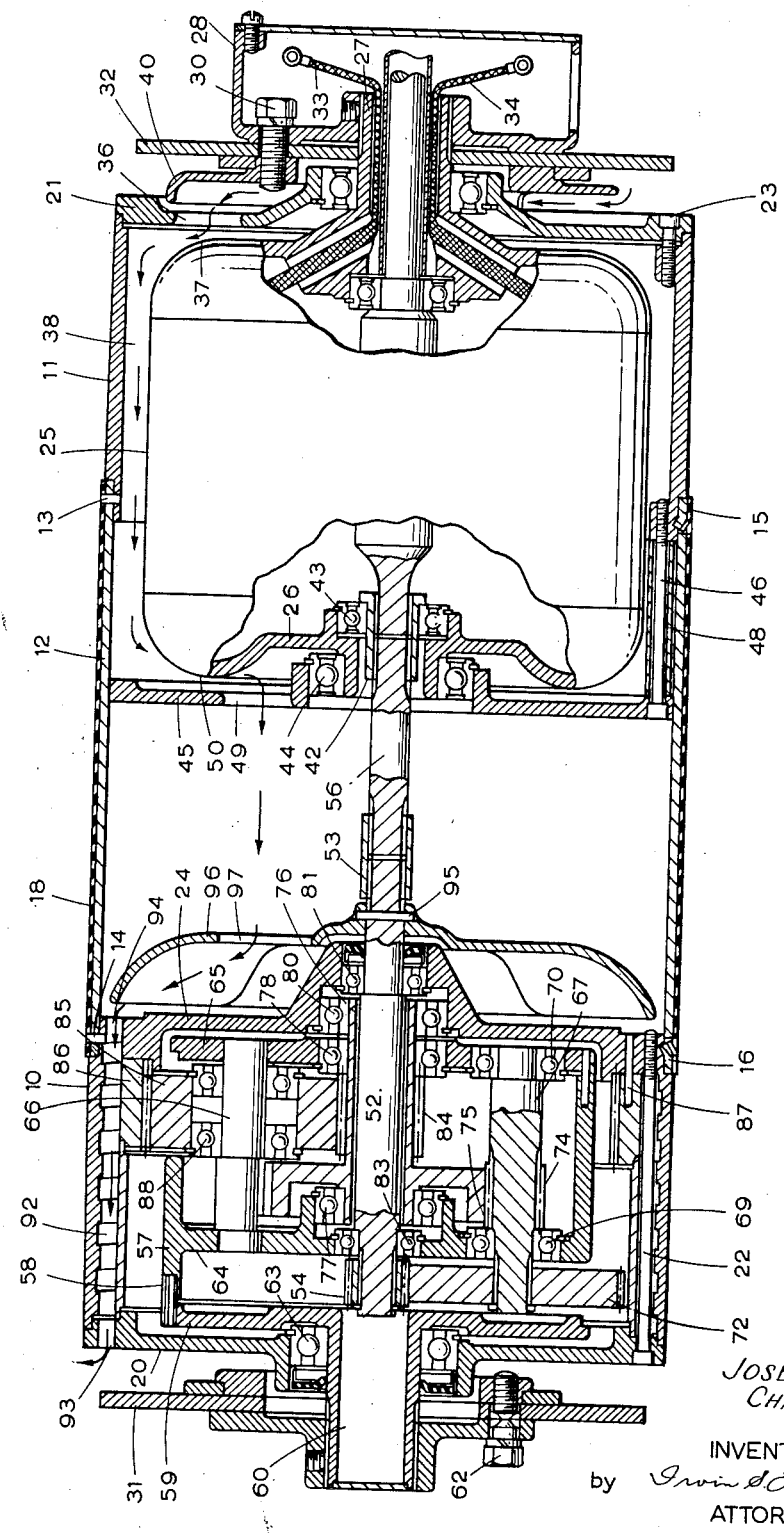
INVENTORS
JOSEPH DENNIS CHRISTIAN
by Irvin S. Thompson
ATTORNEY

United States Patent Office 3,056,054
Patented Sept. 25, 1962

3,056,054
PULLEYS AND LIKE POWER DRIVE DEVICES
Joseph Dennis Christian, San Francisco, Calif., assignor to Holo-Flite International Incorporated, San Francisco, Calif.
Filed June 1, 1960, Ser. No. 33,335
2 Claims. (Cl. 310—59)

This invention relates to power drive devices such as pulleys and speed reducing drives of the kind in which a pulley or other tubular member contains an electric motor and reduction gearing. One reason why such pulleys have not so far been widely accepted in practice is that the electric motor is rated at a low value largely due to the heat developed within the pulley. Success has not hitherto been achieved in efficiently removing this heat and the main object of the present invention is to do this by a simple construction which is reliable for the life of the pulley and which will not become inoperative even under arduous working conditions. The invention is, however, suitable for speed reducing devices other than pulleys.

According to the present invention a power driving device comprises a tubular member, an electric motor housed within one end of the tubular member said motor having a driven shaft, end walls connected to the opposite ends of the tubular member, the end wall of the motor end having first air flow openings therein; second air flow openings also being provided in or near the other end wall, a speed reducing gearing housed in the other end of the tubular member and having an input shaft and an output member, means for connecting said motor shaft drivably to the gearing input shaft, a fan mounted on one end of said shafts, an air flow channel between the motor and the tubular member, and an air flow passage between the fan and the end wall at the gearing end of the housing, whereby air for cooling the motor is drawn in through the air flow openings at one end of the tubular member, conducted over the motor and gearing and discharged through the air flow openings at the other end of the tubular member.

The invention will now be more fully described by way of example with reference to the accompanying diagrammatic drawing which is a sectional view of a pulley made in accordance with the invention.

The pulley comprises a pulley drum made in three parts viz. end parts 10, 11 connected together to form a continuous pulley drum by an intermediate part 12 located between the parts 10, 11 and fixed thereto by pins 13 and by sprags 15, 16 bent inwardly out of the part 12 and engaging in notches in the parts 10, 11. The part 12 has a rubber or other coating 18. The parts 10, 11 are of approximately equal length and have end walls 20, 21 fixed thereto by screws 22, 23.

An electric motor indicated generally by the arrow 25 has a totally enclosed housing 26 which is very desirable in wet or dusty working conditions. The housing 26 has a tubular spigot 27 that passes out of the drum through the wall 21 and carries a terminal box 28 that is fixed by bolts 30 to one of a pair of spaced apart side plates 31, 32 normally provided in belt conveyor systems. The box 28 receives the ends of the motor conductors 33, 34 and provides connection to a source of power.

The end wall 21 is mounted on a bearing 36 carried by the spigot 27 and has air flow openings such as 36 spaced from the periphery of the wall 21 so that air entering the drum through said openings contacts the end wall of the motor housing 26 at 37 and is deflected thereby outwardly into an air flow passage 38 provided between the housing and the drum over the whole length of the housing. An air deflector plate 40 carried on the bolts 30 serves to guide air into the openings 36 and prevents entry into the drum of material dropping off the conveyor belt.

The motor spindle carries a splined sleeve 42 which is supported by a bearing 43 in the housing 26. The housing 26 carries a bearing 44 on which is mounted an inner wall 45 which supports the drum part 12 and is bolted by bolts 46 to the motor-containing drum part 11 with the interposition of spacer means 48 so that by changing the spacer means the wall 45 can be adjusted axially along the drum part 12 whereby any length of motor can be accommodated.

The wall 45 has air flow openings 49 therein spaced from the periphery of the wall so that the air after traversing the whole length of the housing 26 is caused to flow over the outer end surface 50 of the motor housing for efficient cooling.

Within the drum part 10 is the speed reducing gearing which has a central shaft 52 coaxial with the drum and with the motor shaft and extending completely through the gearing from the motor side of the wall 24 where it carries a splined sleeve 53 to a position adjacent the outer end of the drum part 10 where it carries a high speed pinion 54. The sleeve 53 is connected to the motor sleeve 42 by a short splined connecting shaft 56. The gearing includes a fixed gear housing 57 that is detachably fixed by dowel pins 58 to a plate 59 on a hollow spigot 60 that extends through the wall 20 and carries a fixing disc 61 that is attached by screws 62 to the side plate 31. The wall 20 is mounted on a bearing 63 carried by the spigot 60.

The gear housing has spaced walls 64, 65 which carry a fixed countershaft 66 and a rotary countershaft 67, the latter being mounted in bearings 69, 70.

The pinion 54 meshes with a gearwheel 72 on the rotary countershaft 67. The pinion 54 and gearwheel 72 are located between the walls 59, 64 so that if the spigot 60 and wall 59 are removed the pinion and gearwheel are at once accessible and can be changed to provide a different ratio without disturbing any parts inside the gear housing 57.

The remaining gears are between the walls 64, 65.

The countershaft 67 carries an integral pinion 74 meshing with a gearwheel 75 that is carried on a sleeve 76. This sleeve is mounted at opposite ends in bearings 77, 78 carried respectively by the walls 64, 65.

The inner end of the sleeve carries a bearing 80 on which the drum wall 24 is mounted. The drum wall carries a bearing 81 in which one end of the shaft 52 is mounted, the other end of this shaft being mounted in a bearing 83 carried by the wall 64.

The sleeve 76 carries an integral pinion 84 that meshes with an idler gearwheel 85 which, in turn meshes with internally toothed gear 86 fixed by dowel pins 87 to the drum wall 24. The idler gearwheel is mounted by a bearing 88 on the fixed countershaft 66. A spacer sleeve 90 is disposed between the drum wall 20 and the internal gear 86 and the parts 90, 86 are spaced from the drum part 10 to define an air flow passage 92. The walls 20, 24 have air flow openings 93, 94 therein adjacent the peripheries of these walls communicating with the passage 92.

Mounted on the shaft 52 and fixed thereto by pin 95 is a fan 96 located on the motor side of the wall 24 close to said wall. The fan has air flow openings 97 therein spaced from its periphery and the fan is shaped to impel the air outwardly into the openings 94. Thus, the fan draws air in through the openings 36, over the end surface of the housing 26, over the whole outer surface of the housing, over the outer end surface of the housing, through openings 49, 97, 94, passage 92 to discharge at 93 whereby a continuous flow completely through the drum is achieved thereby providing highly effective cooling and enabling the motor to be used at high rating so that a smaller motor can be used for a given output.

In addition to the advantages above described:

The idler 85 on the fixed countershaft provides a simplification of parts.

The mounting of the fan on the gear shaft adjacent the gear enables the fan to remain in fixed position irrespective of length of the intermediate part 12 which can be varied according to the required belt width.

Attaching the spigot 27 to the plate 32 by the intermediary of the junction box provides a simplification and axial shortening of design.

The straight through gear shaft 52 facilitates mounting of bearings and backstop if required and overload release (e.g. by making 62 a shear pin) if required.

The gear housing 57 transmits the driving torque, provides an oil bath which can be adjusted as to angle about the gear axis. This housing can be connected to a shock absorber. The shaft 52 can be extended for connection to a further gear reduction device.

Accessibility is provided to all parts of the gearing and motor without moving the drum.

Since the length of part 10 is the same as that of part 11, the middle of part 12 is always the middle of the pulley face irrespective of the length of the motor or of part 12.

If desired the inner surface of part 10 may be provided with a helical groove to eject any water or material that may enter at 93.

The shaft 52 has widely spaced bearings and passes through sleeve 76 which is in effect a second rotary countershaft. The high speed pinion 54 and low speed pinion 84 are coaxial with each other. This arrangement facilitates smooth silent running.

I claim:

1. A power driving device comprising a tubular pulley drum, an electric motor housed within one end of the drum, said motor having a housing and a driven shaft, end walls connected to the opposite ends of the drum, the end wall of the motor end having first air flow openings therein; second air flow openings also being provided in or near the other end wall, a speed reducing gearing housed in the other end of the drum and having an input shaft and an output member, means for connecting said motor shaft drivably to the gearing input shaft, means for connecting the gearing output member drivably to the drum, a fan mounted on one of said shafts so as to be located between said motor and said gearing, an air flow channel between the motor and the drum, and an air flow passage between the gearing and the drum and between the fan and the end wall at the gearing end of the housing, said fan having a diameter greater than that of the motor housing and extending into close proximity with the drum whereby air for cooling the motor is drawn in through the air flow openings at one end of the drum, conducted over the motor, and projected by the fan against the drum at a position between the motor and the gearing and through the air flow openings at the other end of the drum.

2. A power driving device as claimed in claim 1 wherein the inner end of the gearing is carried by a bearing in a wall in the drum, which wall has air flow openings therein near the periphery thereof, and the air flow passage is between the drum and the gearing, and the second air flow openings are in the end wall adjacent the gearing.

References Cited in the file of this patent

UNITED STATES PATENTS

| 1,325,232 | Cook | Dec. 16, 1919 |
| 2,739,251 | Ingalls | Mar. 20, 1956 |

FOREIGN PATENTS

| 392,694 | Germany | Mar. 27, 1924 |
| 648,248 | Germany | July 21, 1937 |
| 674,587 | France | Oct. 22, 1929 |